(12) United States Patent
Bledsoe

(10) Patent No.: US 11,871,858 B1
(45) Date of Patent: Jan. 16, 2024

(54) FOLDABLE SHELF SYSTEM

(71) Applicant: Dustin Bledsoe, Mount Airy, NC (US)

(72) Inventor: Dustin Bledsoe, Mount Airy, NC (US)

( * ) Notice: Subject to any disclaimer, the term of this patent is extended or adjusted under 35 U.S.C. 154(b) by 0 days.

(21) Appl. No.: 17/867,907

(22) Filed: Jul. 19, 2022

(51) Int. Cl.
*A47F 5/00* (2006.01)
*A47F 5/11* (2006.01)
*A47F 5/08* (2006.01)
*A47F 5/10* (2006.01)

(52) U.S. Cl.
CPC .............. *A47F 5/0068* (2013.01); *A47F 5/08* (2013.01); *A47F 5/10* (2013.01); *A47F 5/112* (2013.01)

(58) Field of Classification Search
CPC .. A47F 5/0068; A47F 5/08; A47F 5/10; A47F 5/112; A47F 5/11; A47F 5/14; A47F 5/0043; A63H 3/50; A47B 43/02; A47B 96/027
USPC .... 211/70.1, 73, 72, 126.16, 50, 90.01, 149, 211/90.02, 135; 248/247, 248
See application file for complete search history.

(56) References Cited

U.S. PATENT DOCUMENTS

| | | | | |
|---|---|---|---|---|
| 1,239,485 A | * | 9/1917 | Heywood | A47F 5/112 248/174 |
| 1,254,639 A | * | 1/1918 | Lang | A47F 5/112 248/152 |
| 1,270,718 A | * | 6/1918 | Ford | A47B 13/081 248/248 |
| 1,312,379 A | * | 8/1919 | Adams | B42F 17/02 211/69.1 |
| 1,470,159 A | * | 10/1923 | Gibson | A47F 5/112 248/459 |
| 1,560,009 A | * | 11/1925 | Wobber | G09F 3/20 206/557 |
| 1,683,007 A | * | 9/1928 | Ziemmerman | A47F 5/112 40/617 |
| 1,927,028 A | * | 9/1933 | Haas | A47F 5/112 428/12 |
| 1,933,374 A | * | 10/1933 | Haggard | A47F 5/08 211/90.01 |
| 2,019,826 A | * | 11/1935 | McKee | G09F 1/14 211/50 |
| 2,035,021 A | * | 3/1936 | Pyle | A47F 5/112 248/459 |
| 2,115,243 A | * | 4/1938 | Schmidt | G09F 5/00 40/124 |
| 2,118,821 A | * | 5/1938 | Ringler | A63H 33/16 229/168 |
| 2,149,978 A | * | 3/1939 | Noel | G09F 7/00 248/459 |
| 2,324,232 A | * | 7/1943 | Pantalone | A47F 5/112 211/73 |

(Continued)

*Primary Examiner* — Jennifer E. Novosad
(74) *Attorney, Agent, or Firm* — Kyle A. Fletcher, Esq.

(57) ABSTRACT

The foldable shelf system comprises one or more unfolded sheets that may be folded to form a shelf system. The shelf system may be mounted on a wall and may be operable to display a publication and a token. The publication may be displayed while held in a vertical orientation. The token may be displayed while resting on a shelf. As non-limiting examples, the publication may be a comic book, a magazine such as a sports magazine, a journal, or a photograph. The token may be an action figure, autographed memorabilia such as an autographed baseball, or an award such as a trophy or a ribbon. The display of the publication and the token together on the shelf system may suggest an association between the publication and the token.

18 Claims, 6 Drawing Sheets

(56) References Cited

U.S. PATENT DOCUMENTS

| | | | | |
|---|---|---|---|---|
| 2,391,285 A | * | 12/1945 | Williamson | A47F 5/112 D6/310 |
| 2,503,413 A | * | 4/1950 | Ressinger | A47F 5/00 211/72 |
| 2,639,040 A | * | 5/1953 | Tapley | A47F 5/0068 211/119.003 |
| 2,931,515 A | * | 4/1960 | Rubin | A47F 5/112 211/195 |
| 2,950,013 A | * | 8/1960 | Malnove | A47F 5/112 211/73 |
| 3,012,348 A | * | 12/1961 | Smith | A47B 63/00 312/193 |
| 3,086,658 A | * | 4/1963 | Palmer | B42D 5/005 40/737 |
| 3,314,634 A | * | 4/1967 | Carter | H01F 7/0252 211/39 |
| 3,692,174 A | * | 9/1972 | Ross | B65D 5/5206 229/173 |
| 3,741,403 A | * | 6/1973 | Fleischer, Jr. | A47B 87/0269 211/44 |
| 4,143,847 A | * | 3/1979 | Cross | A47B 19/08 248/459 |
| 4,365,720 A | * | 12/1982 | Kaneshiro | B25H 3/006 211/73 |
| 4,395,056 A | * | 7/1983 | Sferragatta | B42D 5/006 281/31 |
| 4,505,395 A | * | 3/1985 | Nathan | A47F 7/147 403/292 |
| 4,630,731 A | * | 12/1986 | Albery | G09F 19/00 D19/78 |
| 4,653,637 A | * | 3/1987 | Wallace | B25H 3/04 211/70.1 |
| 4,723,492 A | * | 2/1988 | Salvatini | A47F 5/112 108/42 |
| RE32,668 E | * | 5/1988 | Smith | A47F 5/116 211/132.1 |
| 4,828,121 A | * | 5/1989 | Willcocks, Jr. | A47F 5/0068 D6/567 |
| 4,844,264 A | * | 7/1989 | Deskiewicz, Jr. | A47F 3/14 D18/49 |
| 4,938,365 A | * | 7/1990 | Conway | A47B 47/00 211/175 |
| 5,042,768 A | * | 8/1991 | Goldstein | G09F 3/204 248/223.41 |
| 5,083,663 A | * | 1/1992 | Conway | B65D 5/5206 248/463 |
| 5,094,349 A | * | 3/1992 | DeVito | A47F 7/147 211/88.01 |
| 5,100,090 A | * | 3/1992 | Drower | A47B 96/027 248/248 |
| 5,150,813 A | * | 9/1992 | Harris | B29C 33/44 206/45.26 |
| 5,277,388 A | * | 1/1994 | Denaro | A47F 5/112 248/152 |
| 5,301,800 A | * | 4/1994 | Kenney | A47F 5/112 206/45.25 |
| 5,542,551 A | * | 8/1996 | Smith | A47F 7/146 211/132.1 |
| 5,641,079 A | * | 6/1997 | Schmidt | A47F 5/0823 211/104 |
| 5,722,628 A | * | 3/1998 | Menaged | A47B 23/043 248/455 |
| 5,727,696 A | * | 3/1998 | Valiulis | A47F 1/126 40/737 |
| 5,868,367 A | * | 2/1999 | Smith | A47F 5/112 248/459 |
| 6,092,673 A | * | 7/2000 | Woolnough | A47F 7/146 211/50 |
| 6,398,178 B1 | * | 6/2002 | Azola | G06F 1/1611 248/442.2 |
| 6,578,717 B2 | * | 6/2003 | Pickett | A47B 65/00 D19/34.1 |
| 6,938,765 B2 | * | 9/2005 | Awad | A45D 27/24 220/482 |
| 7,331,296 B1 | * | 2/2008 | Wood | A47B 96/02 108/42 |
| 8,376,299 B2 | * | 2/2013 | Burkman | A47F 7/144 248/248 |
| 8,561,816 B2 | * | 10/2013 | Martin | A47F 5/0025 211/10 |
| 9,610,900 B1 | * | 4/2017 | Bello | B60N 3/103 |
| 9,699,924 B2 | * | 7/2017 | Hagen | H05K 5/0204 |
| 10,118,434 B2 | * | 11/2018 | Thorsbakken | A47F 5/10 |
| 10,181,273 B2 | * | 1/2019 | Norman | G09F 3/204 |
| 10,293,756 B1 | * | 5/2019 | Kollias | B64D 11/00 |
| 2011/0180502 A1 | * | 7/2011 | Clark | A47B 96/027 211/90.04 |

\* cited by examiner

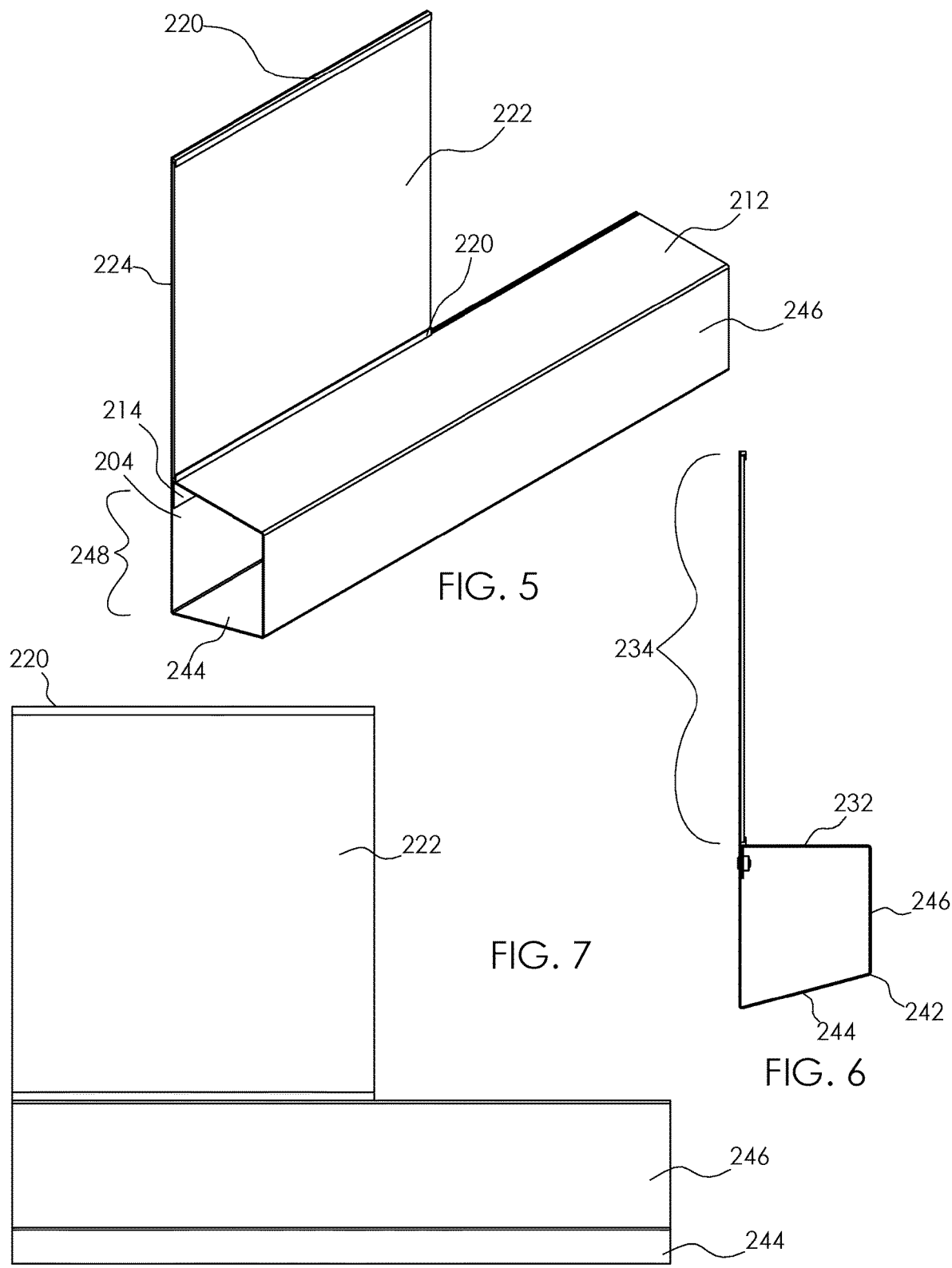

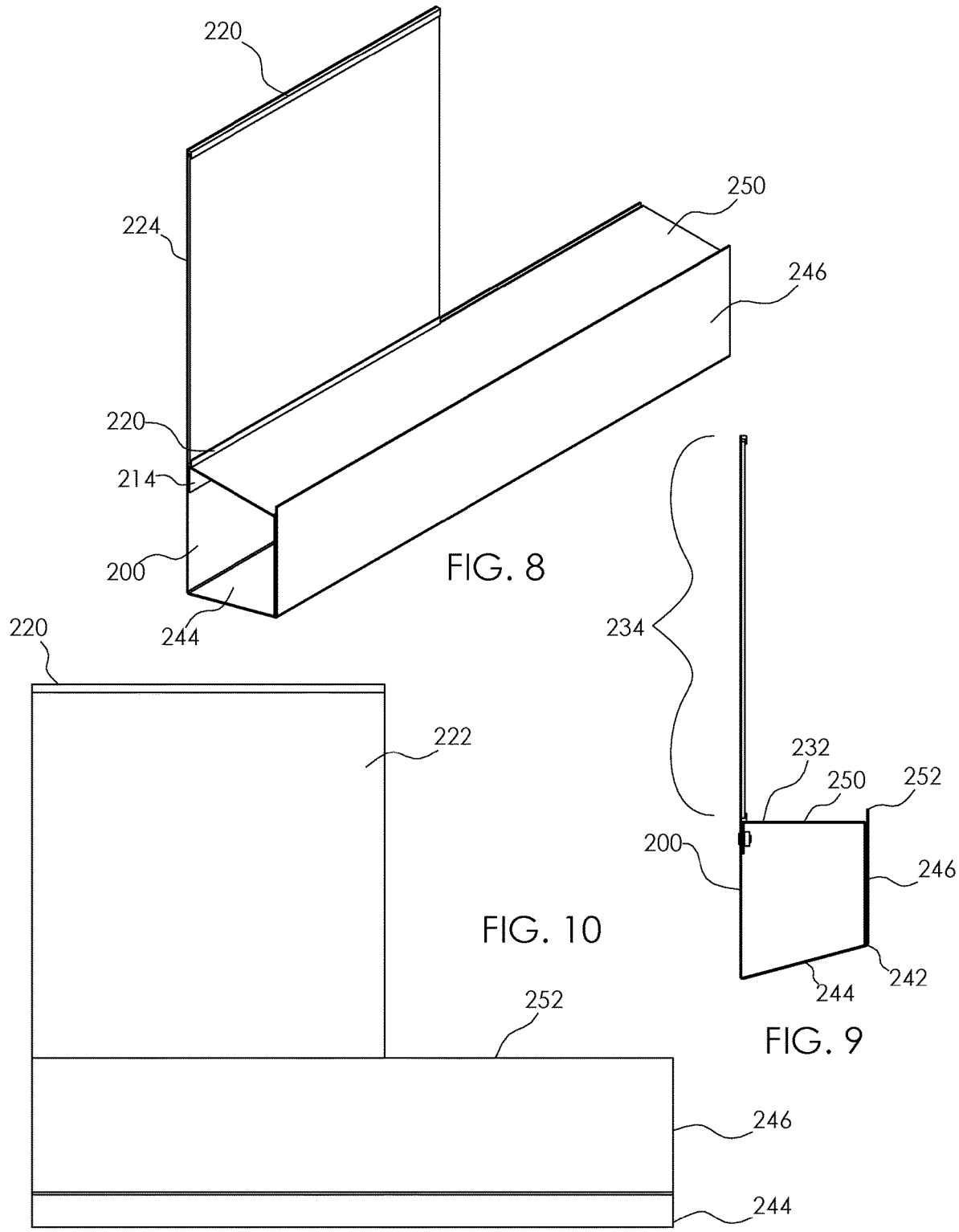

FOLDABLE SHELF SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of shelving systems, more specifically, a foldable shelf system.

SUMMARY OF INVENTION

The foldable shelf system comprises one or more unfolded sheets that may be folded to form a shelf system. The shelf system may be mounted on a wall and may be operable to display a publication and a token. The publication may be displayed while held in a vertical orientation. The token may be displayed while resting on a shelf. As non-limiting examples, the publication may be a comic book, a magazine such as a sports magazine, a journal, or a photograph. The token may be an action figure, autographed memorabilia such as an autographed baseball, or an award such as a trophy or a ribbon. The display of the publication and the token together on the shelf system may suggest an association between the publication and the token.

An object of the invention is to provide one or more unfolded sheets that may be folded and mounted on a wall as a shelf system.

Another object of the invention is to display a publication above a shelf of the shelf system.

A further object of the invention is to display a token on the shelf.

Yet another object of the invention is to provide a clear cover sheet to protect the publication and one or more publications support channels to retain the publication and the clear cover sheet.

These together with additional objects, features and advantages of the foldable shelf system will be readily apparent to those of ordinary skill in the art upon reading the following detailed description of the presently preferred, but nonetheless illustrative, embodiments when taken in conjunction with the accompanying drawings.

In this respect, before explaining the current embodiments of the foldable shelf system in detail, it is to be understood that the foldable shelf system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the foldable shelf system.

It is therefore important that the claims be regarded as including such equivalent construction insofar as they do not depart from the spirit and scope of the foldable shelf system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is an isometric view of a first alternative embodiment of the disclosure.

FIG. 6 is a side view of a first alternative embodiment of the disclosure.

FIG. 7 is a front view of a first alternative embodiment of the disclosure.

FIG. 8 is an isometric view of a second alternative embodiment of the disclosure.

FIG. 9 is a side view of a second alternative embodiment of the disclosure.

FIG. 10 is a front view of a second alternative embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
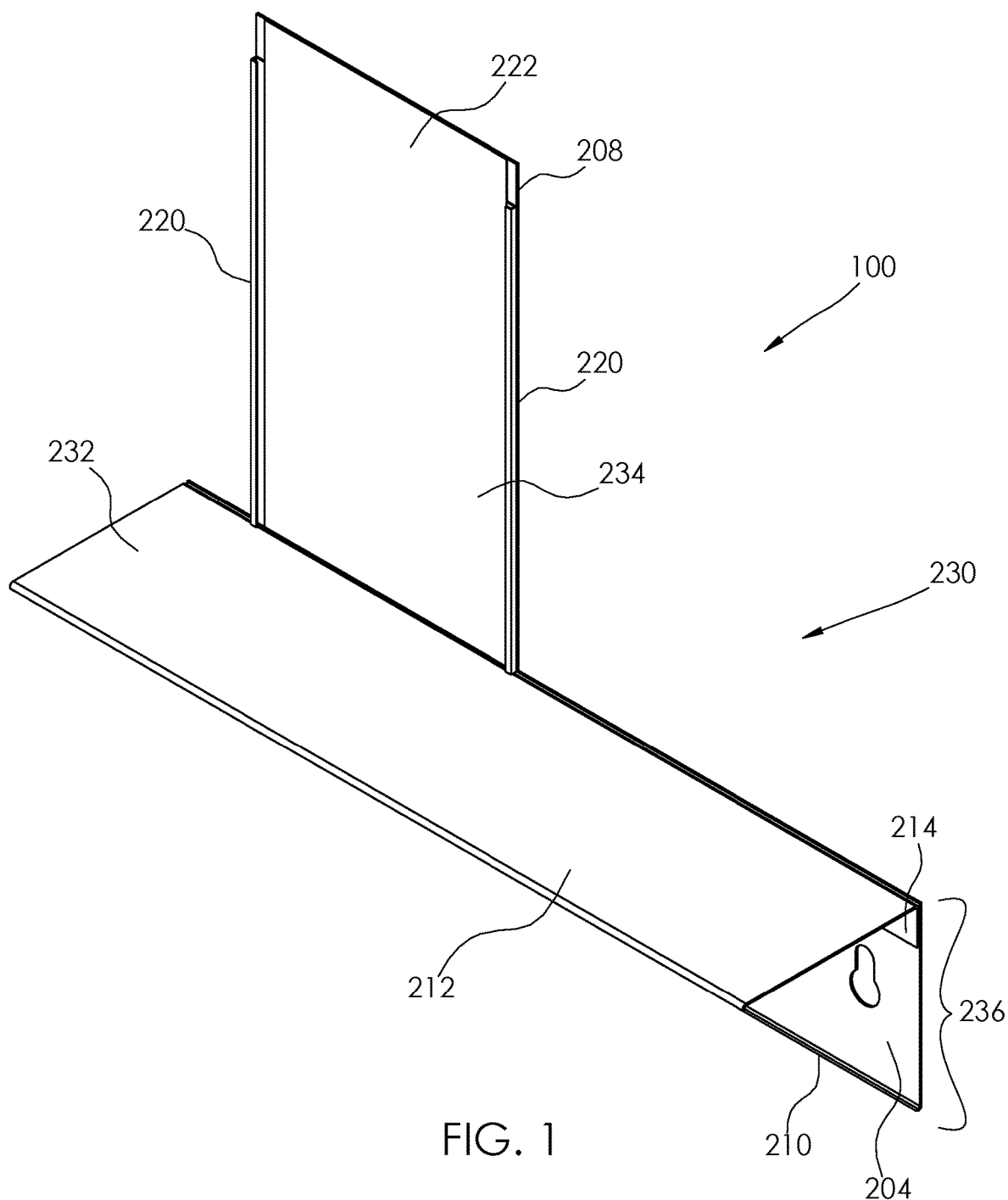
FIG. 1 is an isometric view of an embodiment of the disclosure.
Figure 2:
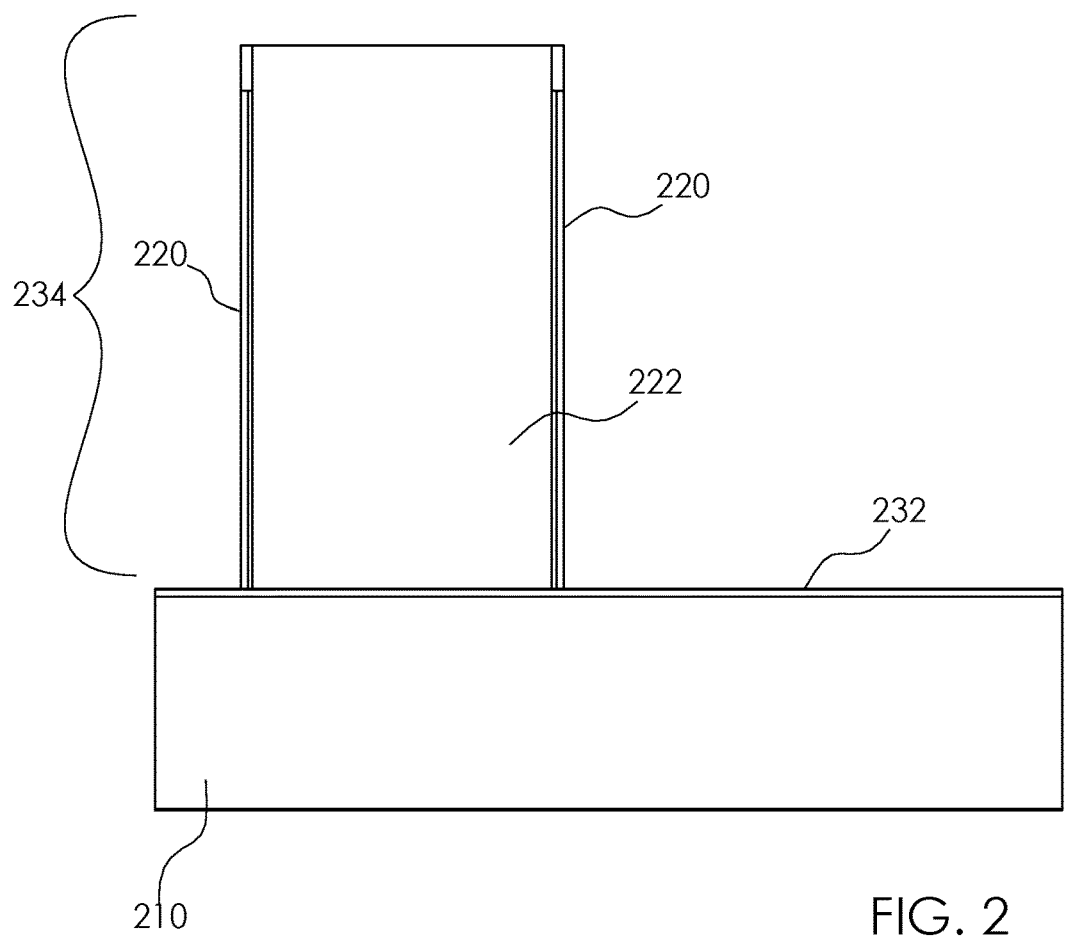
FIG. 2 is a front view of an embodiment of the disclosure.
Figure 3:
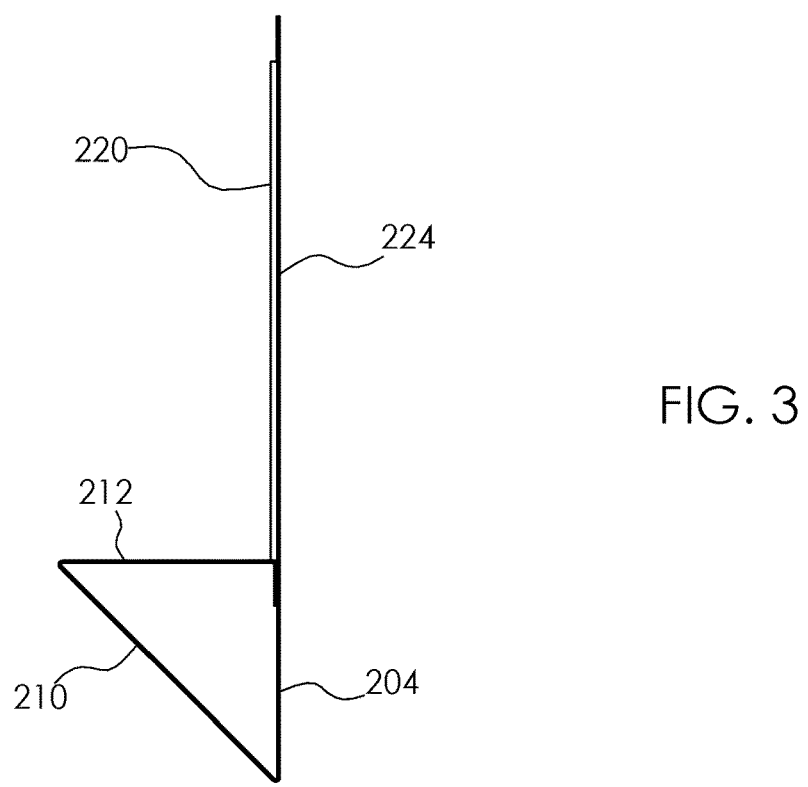
FIG. 3 is a side view of an embodiment of the disclosure.
Figure 4:
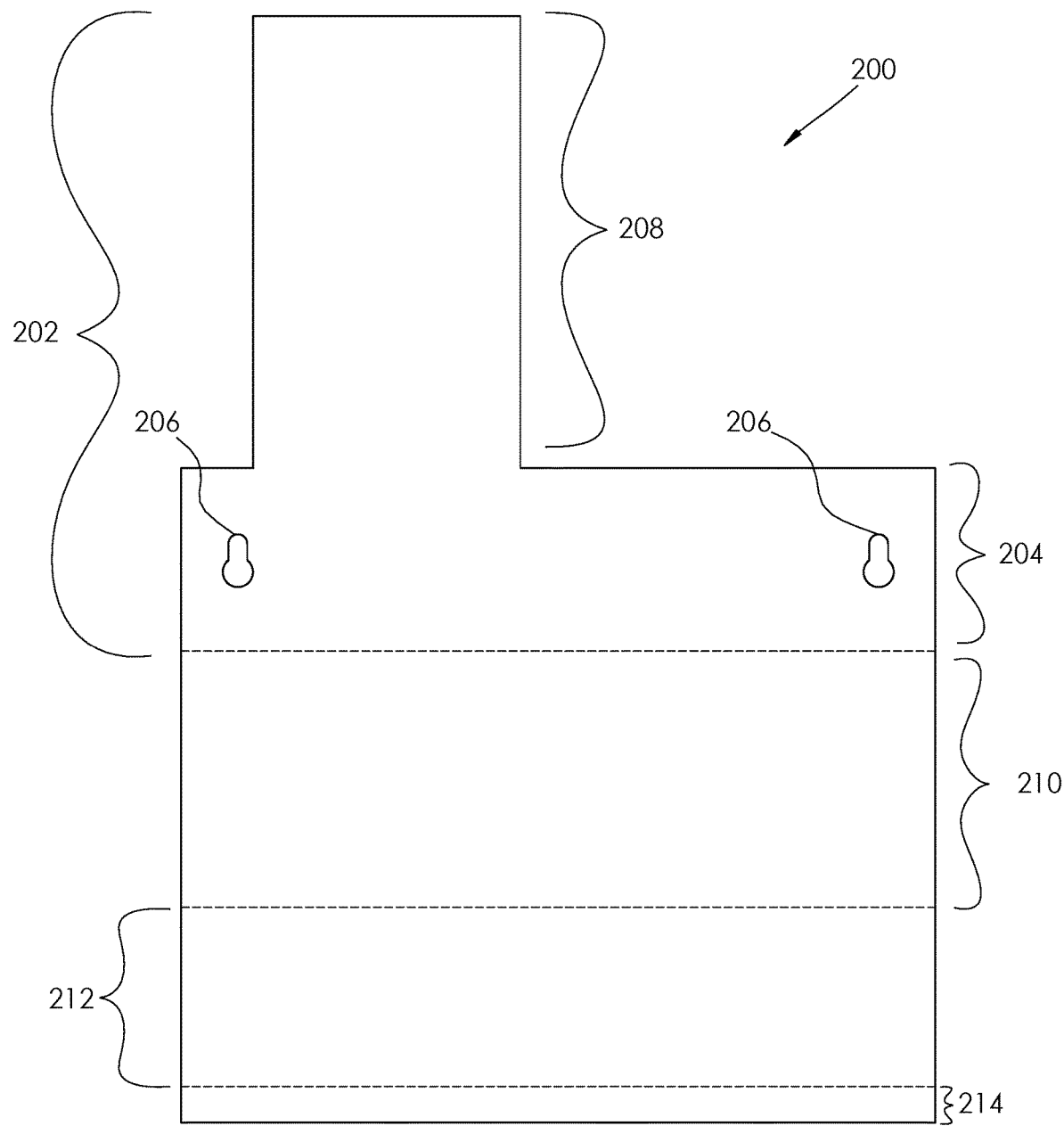
FIG. 4 is a detail view of an embodiment of the disclosure illustrating a first sheet unfolded.
Figure 11:
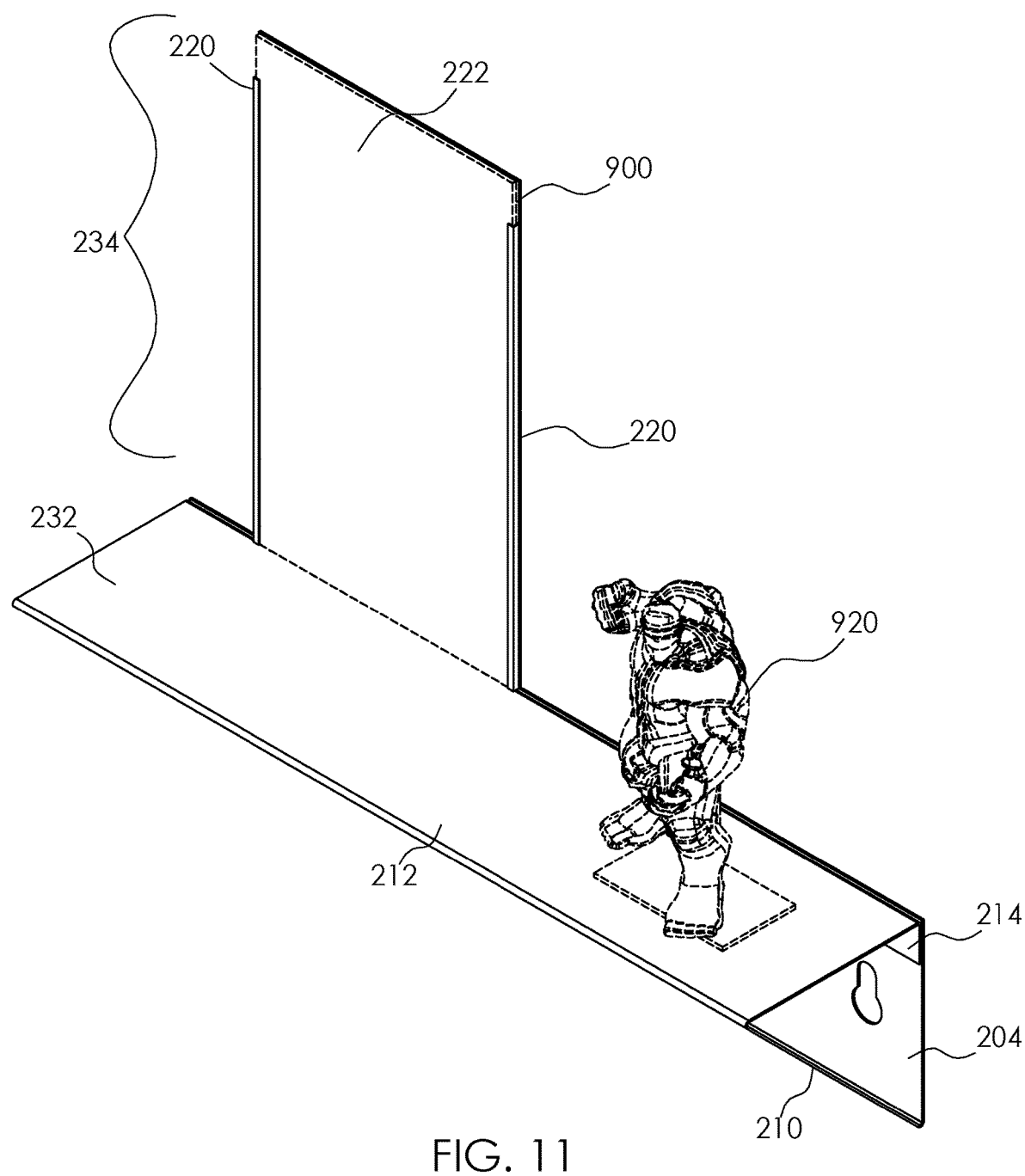
FIG. 11 is an in-use view of an embodiment of the disclosure.

Detailed reference will now be made to a first potential embodiment of the disclosure, which is illustrated in FIGS. 1 through 11.

The foldable shelf system 100 (hereinafter invention) comprises one or more unfolded sheets that may be folded to form a shelf system 230. The shelf system 230 may be mounted on a wall and may be operable to display a publication 900 and a token 920. The publication 900 may be displayed while held in a vertical orientation. The token 920 may be displayed while resting on a shelf 232. As non-limiting examples, the publication 900 may be a comic book, a magazine such as a sports magazine, a journal, or a photograph. The token 920 may be an action figure, autographed memorabilia such as an autographed baseball, or an award such as a trophy or a ribbon. The display of the publication 900 and the token 920 together on the shelf system 230 may suggest an association between the publication 900 and the token 920.

A first sheet 200 of the one or more unfolded sheets may define a backwall portion 202, a brace portion 210, a shelf portion 212, and an overlap tab 214. The backwall portion 202 may be the topmost portion and may be positioned against the wall when the invention 100 is in use. The backwall portion 202 may further define a publication backing 208 and a shelf backing 204. The publication backing 208 may be the upper portion of the backwall portion 202 and the shelf backing 204 may be the lower portion of the backwall portion 202. The publication backing 208 may be narrower than the shelf backing 204.

The first sheet 200 may be folded at the boundary between the backwall portion 202 and the brace portion 210 such that the brace portion 210 projects forward and upward at an oblique angle. The first sheet 200 may be folded at the boundary between the brace portion 210 and the shelf portion 212 such that the shelf portion 212 projects horizontally towards the rear. The first sheet 200 may be folded at the boundary between the shelf portion 212 and the overlap tab 214 such that the overlap tab 214 projects vertically downwards. The overlap tab 214 may be coupled to the backwall portion 202 at the top of the shelf backing 204 such that the shelf backing 204, the brace portion 210, and the shelf portion 212 form a triangular support tube 236. The overlap tab 214 may be coupled to the backwall portion 202 using hook and loop fasteners, mounting hardware, adhesives, magnetics, or any combination thereof.

In some embodiments, the shelf backing 204 may comprise one or more mounting apertures 206 for mounting the invention 100 to the wall.

The publication backing 208 may comprise one or more publication support channels 220 that may be operable to retain the publication 900 to the publication backing 208. As non-limiting examples, the one or more publication support channels 220 may be U-channels of J-channels coupled to the publication backing 208 and reaching around in front of the publication backing 208. In some embodiments, the one or more publication support channels 220 may be oriented vertically along the sides of the publication backing 208 such that the publication 900 may slide down into the one or more publication support channels 220. In some embodiments, the one or more publication support channels 220 may be oriented horizontally along the top and bottom of the publication backing 208 such that the publication 900 may slide into the one or more publication support channels 220 from the side.

The invention 100 may comprise a clear cover sheet 222 that may be positioned in front of the publication 900 to protect the publication 900. The clear cover sheet 222 may be held in place by the one or more publication support channels 220.

In some embodiments, the publication backing 208 may comprise a magnetic backing 224 coupled to the rear of the publication backing 208 such that the invention 100 may be displayed on a metal object. As non-limiting examples, the metal object may be a metal wall, a side of an appliance such as a refrigerator, or the side of a filing cabinet.

Once assembled, the publication backing 208, the one or more publication support channels 220, and the clear cover sheet 222 may comprise a publication display 234 for displaying the publication 900 and the shelf portion 212 supported by the brace portion 210 may comprise the shelf 232 for displaying the token 920.

In some embodiments, the invention 100 may comprise a decorative motif. The decorative motif may comprise a color scheme, an insignia, or both. As non-limiting examples, the insignia may comprise a logo or a brand name.

As non-limiting examples, the one or more unfolded sheets may be made of cardboard, plastic, metal feature, or any combination thereof. Some or all of the materials comprising the one or more unfolded sheets may be corrugated for strength. The one or more unfolded sheets may be creased, scored, routed, milled, or otherwise pre-conditioned for bending.

In a first alternative embodiment, the brace portion 210 may comprise a brace fold 242 to define a brace upper wall 246 and a brace lower wall 244 and resulting in a trapezoidal support tube 248 under the shelf 232. The brace upper wall 246 may be oriented vertically beneath the front edge of the shelf 232, making the brace upper wall 246 visible. The brace upper wall 246 may thus be oriented to display at least part of the decorative motif.

In a second alternative embodiment, the invention 100 may comprise a second sheet 250. The first sheet 200 may comprise only the backwall portion 202, the brace lower wall 244, and the brace upper wall 246. The second sheet 250 may comprise a duplicate of the brace upper wall 246, the shelf portion 212, and the overlap tab 214. The brace upper wall 246 on the first sheet 200 may overlap the brace upper wall 246 on the second sheet 250 with the brace upper wall 246 on the first sheet 200 positioned in front of the brace upper wall 246 on the second sheet 250. The brace upper wall 246 on the first sheet 200 may extend higher vertically than the brace upper wall 246 on the second sheet 250 such that the brace upper wall 246 on the first sheet 200 forms a lip 252 at the front of the shelf 232. The lip 252 may be operable to prevent the token 920 from sliding off of the front of the shelf 232. The brace upper wall 246 on the first sheet 200 may couple to the brace upper wall 246 on the second sheet 250 using hook and loop fasteners, mounting hardware, adhesives, magnetics, or any combination thereof.

In use, the one or more unfolded sheets may be folded and mounted on a wall. A publication 900 may be displayed by inserting the publication 900 between the publication backing 208 and the clear cover sheet 222, held in place by the one or more publication support channels 220. A token 920 may be displayed to the side of the publication 900 may placing the token 920 on the shelf 232.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

As used in this disclosure, a "brace" may be a structural element that is used to support or otherwise steady an object.

As used herein, "comic book" (aka comic, comic magazine) may refer to a publication comprising drawings in the form of sequential panels that represent individual scenes. The panels may comprise descriptive prose, written narrative, and/or dialogue contained in word balloons. The term "graphic novel" is closely related—a graphic novel is a complete story from beginning to end in comic format whereas a comic book may be a portion of a story that is delivered on a periodic basis. Graphic novels may be thicker than comic books and may be bound differently.

As used herein, the words "couple", "couples", "coupled" or "coupling", may refer to connecting, either directly or indirectly, and does not necessarily imply a mechanical connection.

As used in this disclosure, "decorative" may be an adjective that refers to a first object or item that is used with a second object or item of the purpose of making the second object or item more attractive and/or more distinct. Decorative will generally, but not necessarily, imply making the second object or item more attractive visually.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hook and loop fastener" may be a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks may couple to the plurality of loops securely fastening the hook surface to the loop surface. The hook surface may sometime be referred to as a hard side fastener and the loop surface may sometimes be referred to as a soft side fastener.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, a "logo" may be artwork that is typically associated with an organization, brand, or activity. The logo may be textual, graphical, or both.

As used herein, "mounting hardware" may refer to mechanical devices that are used to attach one object to another, including devices whose only purpose is to improve aesthetics. As non-limiting examples, mounting hardware may comprise screws, nuts, bolts, washers, rivets, crossbars, hooks, collars, nipples, cams, standoffs, knobs, caps, plates, rails, lips, brackets, or any combination thereof.

As used herein, "oblique angle" may refer to any angle that is not a right angle or a multiple of a right angle.

As used in this disclosure, "orientation" may refer to the positioning and/or angular alignment of a first object relative to a second object or relative to a reference position or reference direction.

As used in this disclosure, a "tab" may be an extension of an object for the purpose of facilitating the manipulation of the object, identifying the object, or attaching the object to another object.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 11, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A foldable shelf system comprising:
   one or more unfolded sheets that are folded to form a shelf;
   wherein the shelf system is configured to be mounted on a wall and is operable to display a publication and a token;
   wherein the publication is adapted to be displayed while held in a vertical orientation;
   wherein the token is adapted to be displayed while resting on the shelf;
   wherein a first sheet of the one or more unfolded sheets defines a backwall portion, a brace portion, a shelf portion, and an overlap tab;
   wherein the first sheet is folded at the boundary between the backwall portion and the brace portion such that the brace portion projects forward and upward at an oblique angle;
   wherein the first sheet is folded at the boundary between the brace portion and the shelf portion such that the shelf portion projects horizontally towards the rear;
   wherein the first sheet is folded at the boundary between the shelf portion and the overlap tab such that the overlap tab projects vertically downwards.

2. The foldable shelf system according to claim 1
   wherein the backwall portion is the topmost portion and is positioned against the wall when the foldable shelf system is in use;
   wherein the backwall portion further defines a publication backing and a shelf backing;
   wherein the publication backing is the upper portion of the backwall portion and the shelf backing is the lower portion of the backwall portion;
   wherein the publication backing is narrower than the shelf backing.

3. The foldable shelf system according to claim 2
   wherein the overlap tab is coupled to the backwall portion at the top of the shelf backing such that the shelf backing, the brace portion, and the shelf portion form a triangular support tube;
   wherein the overlap tab is coupled to the backwall portion using hook and loop fasteners, mounting hardware, adhesives, magnetics, or any combination thereof.

4. The foldable shelf system according to claim 3
   wherein the shelf backing comprises one or more mounting apertures for mounting the foldable shelf system to the wall.

5. The foldable shelf system according to claim 3
   wherein the publication backing comprises one or more publication support channels that are operable to retain the publication to the publication backing.

6. The foldable shelf system according to claim 5 wherein the one or more publication support channels are oriented vertically along the sides of the publication backing such that the publication is adapted to slide down into the one or more publication support channels.

7. The foldable shelf system according to claim 5 wherein the one or more publication support channels are oriented horizontally along the top and bottom of the publication backing such that the publication is adapted to slide into the one or more publication support channels from the side.

8. The foldable shelf system according to claim 5 wherein the foldable shelf system comprises a clear cover sheet that is adapted to be positioned in front of the publication to protect the publication; wherein the clear cover sheet is held in place by the one or more publication support channels.

9. The foldable shelf system according to claim 8 wherein the publication backing comprises a magnetic backing coupled to the rear of the publication backing such that the foldable shelf system is displayable on a metal object.

10. The foldable shelf system according to claim 8 wherein once assembled, the publication backing, the one or more publication support channels, and the clear cover sheet comprise a publication display for displaying the publication and the shelf portion supported by the brace portion comprise the shelf for displaying the token.

11. The foldable shelf system according to claim 10 wherein the foldable shelf system comprises a decorative motif; wherein the decorative motif comprises a color scheme, an insignia, or both.

12. The foldable shelf system according to claim 11 wherein the insignia comprises a logo or a brand name.

13. The foldable shelf system according to claim 10 wherein the one or more unfolded sheets are made of cardboard, plastic, metal feature, or any combination thereof; wherein the one or more unfolded sheets are creased, scored, routed, milled, or otherwise pre-conditioned for bending.

14. The foldable shelf system according to claim 10 wherein the brace portion comprises a brace fold to define a brace upper wall and a brace lower wall; wherein the brace upper wall is oriented vertically beneath the front edge of the shelf, making the brace upper wall visible.

15. The foldable shelf system according to claim 14 wherein the foldable shelf system comprises a second sheet; wherein the first sheet comprises only the backwall portion, the brace lower wall, and the brace upper wall; wherein the second sheet comprises a duplicate of the brace upper wall, the shelf portion, and the overlap tab.

16. The foldable shelf system according to claim 15 wherein the brace upper wall on the first sheet overlaps the brace upper wall on the second sheet with the brace upper wall on the first sheet positioned in front of the brace upper wall on the second sheet.

17. The foldable shelf system according to claim 16 wherein the brace upper wall on the first sheet extends higher vertically than the brace upper wall on the second sheet such that the brace upper wall on the first sheet forms a lip at the front of the shelf; wherein the lip is operable to prevent the token from sliding off of the front of the shelf.

18. The foldable shelf system according to claim 17 wherein the brace upper wall on the first sheet couples to the brace upper wall on the second sheet using hook and loop fasteners, mounting hardware, adhesives, magnetics, or any combination thereof.

\* \* \* \* \*